United States Patent
Andre et al.

(10) Patent No.: US 10,984,348 B2
(45) Date of Patent: Apr. 20, 2021

(54) CLOUD-BASED DATA INTEGRATION SYSTEM

(71) Applicant: Gateway Ticketing Systems, Inc., Gilbertsville, PA (US)

(72) Inventors: Michael M. Andre, Fleetwood, PA (US); James W. Fritchman, Hatboro, PA (US)

(73) Assignee: Gateway Ticketing Systems, Inc., Gilbertsville, PA (US)

( * ) Notice: Subject to any disclaimer, the term of this patent is extended or adjusted under 35 U.S.C. 154(b) by 458 days.

(21) Appl. No.: 15/909,259

(22) Filed: Mar. 1, 2018

(65) Prior Publication Data

US 2018/0253667 A1    Sep. 6, 2018

Related U.S. Application Data

(60) Provisional application No. 62/465,457, filed on Mar. 1, 2017.

(51) Int. Cl.
*G06Q 10/02*    (2012.01)
*H04L 29/08*    (2006.01)
*H04L 29/06*    (2006.01)

(52) U.S. Cl.
CPC .......... *G06Q 10/02* (2013.01); *H04L 63/08* (2013.01); *H04L 63/12* (2013.01); *H04L 67/10* (2013.01)

(58) Field of Classification Search
CPC .................................................. G06Q 10/02
See application file for complete search history.

(56) References Cited

U.S. PATENT DOCUMENTS

| | | | |
|---|---|---|---|
| 8,397,983 B2 | 3/2013 | Roebke et al. | |
| 2005/0204140 A1* | 9/2005 | Maruyama | G06Q 20/40975 713/175 |
| 2011/0040585 A1* | 2/2011 | Roxburgh | G06Q 10/02 705/5 |
| 2011/0313799 A1* | 12/2011 | Roebke | G07F 17/40 705/5 |
| 2014/0288980 A1 | 9/2014 | Lee et al. | |
| 2015/0039355 A1* | 2/2015 | Gevrey | G06Q 50/14 705/5 |

(Continued)

OTHER PUBLICATIONS

San Diego Zoo Tickets website, published 2016, archived on Nov. 24, 2016, https://zoo.sandiegozoo.org/tickets (Year: 2016).*

(Continued)

*Primary Examiner* — Kevin H Flynn
*Assistant Examiner* — Michelle E Carey
(74) *Attorney, Agent, or Firm* — Barley Snyder

(57) ABSTRACT

A cloud-based data integration system comprises a communication gateway, a system database including a ticket booking record, and a processor executing a plurality of service modules. The communication gateway is configured to receive a booking message from a distributor of a plurality of distributors connected to the integration system. A booking module of the service modules is configured to validate the booking message and determine a supplier of a plurality of suppliers connected to the integration system that corresponds to the booking message, create a booking in the ticket booking record based on the booking message, and transmit the booking to the supplier corresponding to the booking of the plurality of suppliers connected to the integration system.

11 Claims, 7 Drawing Sheets

(56) References Cited

U.S. PATENT DOCUMENTS

2015/0046202 A1\* 2/2015 Hunt ........................ G07C 9/27
                                                        705/5
2015/0229638 A1    8/2015 Loo
2016/0269343 A1    9/2016 Li et al.

OTHER PUBLICATIONS

Notification and International Preliminary Report on Patentability, PCT/US2018/020438, dated Sep. 12, 2019, 9 pages.

\* cited by examiner

US 10,984,348 B2

CLOUD-BASED DATA INTEGRATION SYSTEM

CROSS-REFERENCE TO RELATED APPLICATION

This application claims the benefit of U.S. Provisional Patent Application No. 62/465,457, filed on Mar. 1, 2017.

FIELD OF THE INVENTION

The present invention relates to a cloud-based data integration system and, more particularly, to a cloud-based data integration system coordinating purchase of a ticket used for access to an event or facility.

BACKGROUND

Tickets available for events offered by a supplier are often sold by a distributor. The distributor is an entity other than the supplier and may be, for example, a ticket reseller selling tickets to the supplier such as a museum or a sporting event.

Many distributors are only able to sell vouchers to the consumer for supplier tickets; the distributors are not able to sell the actual supplier tickets to the consumer. When the consumer seeks to redeem the voucher at the supplier, the consumer must wait in line at the supplier to exchange the voucher for an actual ticket before entry. Further, for supplier events that are capacity or resource-limited, the voucher does not guarantee access to the event and, after waiting in line at the supplier, the consumer may be unable to exchange the voucher for a ticket to the desired event.

The only current alternative to the voucher process is for the distributor to build a software integration with each supplier for which the distributor offers a ticket. Given the number of suppliers commonly associated with one distributor, this series of one-off integrations is cost-prohibitive for distributors.

SUMMARY

A cloud-based data integration system comprises a communication gateway, a system database including a ticket booking record, and a processor executing a plurality of service modules. The communication gateway is configured to receive a booking message from a distributor of a plurality of distributors connected to the integration system. A booking module of the service modules is configured to validate the booking message and determine a supplier of a plurality of suppliers connected to the integration system that corresponds to the booking message, create a booking in the ticket booking record based on the booking message, and transmit the booking to the supplier corresponding to the booking of the plurality of suppliers connected to the integration system.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
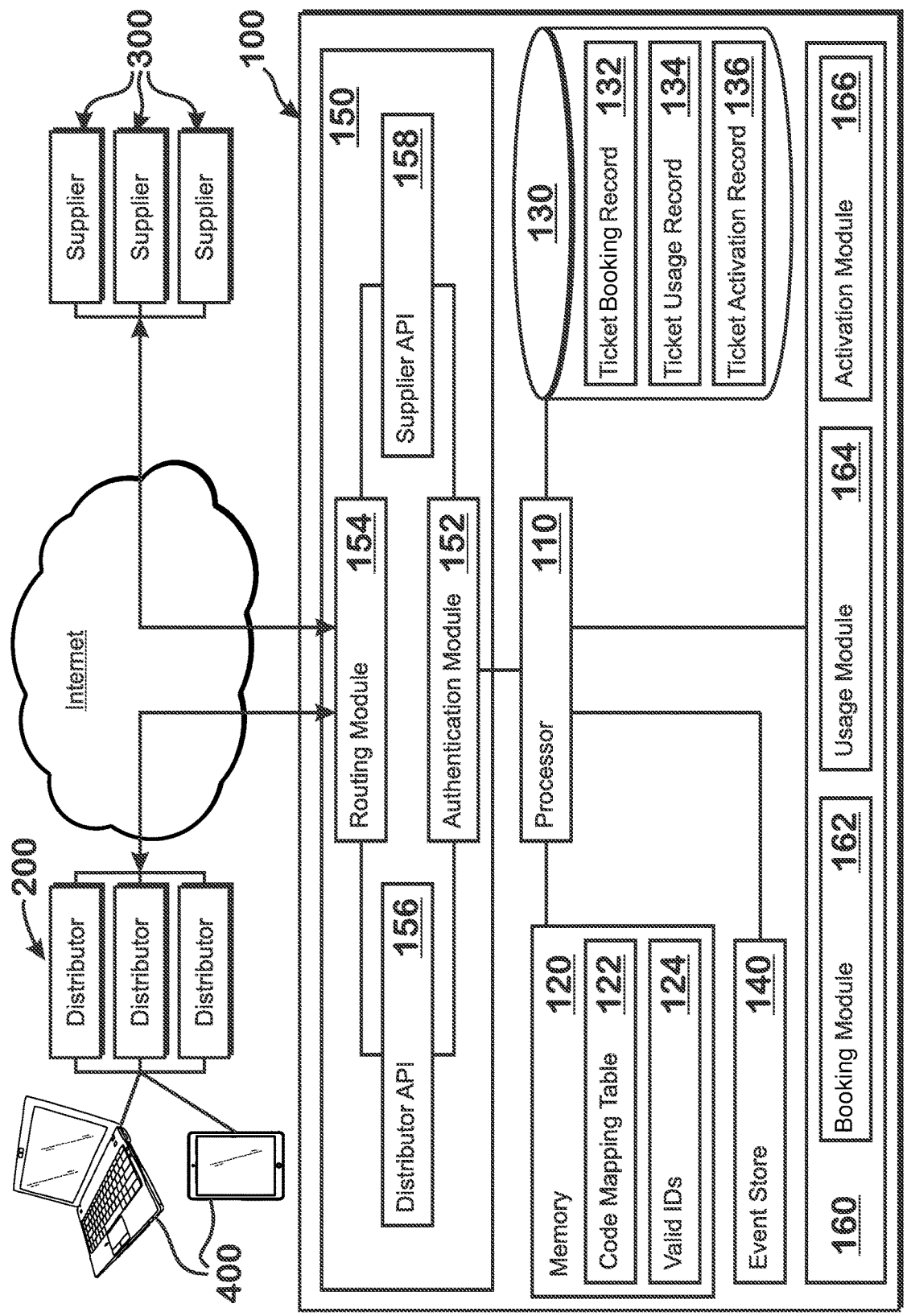
FIG. 1 is a schematic diagram of a cloud-based data integration system with a plurality of distributors, a plurality of suppliers, and a plurality of consumer devices.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

A cloud-based data integration system 100 according to an embodiment is shown in FIG. 1. The terms "cloud-based data integration system" and "integration system" will be used interchangeably throughout the specification. The integration system 100 includes a processor 110, a memory 120, a system database 130, and an event store 140 connected to the processor 110. The integration system 100 further includes a communication gateway 150 and a plurality of service modules 160 executable by the processor 110.

The processor 110 shown in FIG. 1 may be any type of computer processor known to those with ordinary skill in the art and capable of executing the processes described herein. The memory 120 connected to the processor 110 is any non-transitory computer readable medium known to those with ordinary skill in the art including, for example, persistent memory such as magnetic and/or optical disks, ROM, and PROM and volatile memory such as RAM. The memory 120 stores a plurality of algorithms executable by the processor 110. The various algorithms, when executed by the processor 110, implement an authentication module 152 and a routing module 154 of the communication gateway 150 and also implement the services modules 160 as described in greater detail below. The memory 120 also stores a product code mapping table 122 and a list of valid distributor and supplier IDs 124 as shown in FIG. 1.

The event store 140 is a non-transitory computer readable medium storing a sequence of events executed by the processor 110. As with the memory 120 and with all memory described throughout the specification, the event store 140 may include persistent memory such as magnetic and/or optical disks, ROM, and PROM and volatile memory such as RAM.

The communication gateway 150, in addition to the authentication module 152 and the routing module 154, includes a distributor Application Programming Interface ("API") 156 and a supplier API 158 as shown in FIG. 1. The distributor API 156 and the supplier API 158 are each a set of software instructions stored on the system memory 120; each API 156, 158 is set of subroutine definitions, protocols, and tools that, when executed by the processor 110, permits communication between disparate software components. Each API 156, 158 is configured to convert electronic data between different formats such that the same electronic data is readable by each of the disparate software components. In an exemplary embodiment, the distributor API 156 and the supplier API 158 are both configured to convert electronic data between a JavaScript Object Notation ("JSON") format and an Extensible Markup Language ("XML") format. As would be understood by those with ordinary skill in the art, conversion between other known formats is also possible. In an embodiment of the invention, each API 156, 158 is a Representational State Transfer ("RESTful") API.

The integration system 100 is connected to and communicates with a plurality of distributors 200 and a plurality of suppliers 300 over the Internet to integrate data related to tickets across the integration system 100, distributors 200, and suppliers 300. The integration system 100 is cloud-based via the Internet and is located remotely from the distributors 200 and suppliers 300.

Each distributor 200 is an organization that sells or distributes tickets to consumers on behalf of the suppliers 300. In various embodiments, the distributor 200 could be a ticket reseller, a ticket wholesaler, an independent or online travel agent, a travel fare aggregator, a tour operator, or any other entity selling tickets to an event operated by a supplier 300.

Each supplier 300 is a provider of an activity or experience that requires a ticket for access. In an embodiments, the supplier 300 could be a theme park, an amusement park, a museum, a science center, a zoo, an aquarium, or any other form of supplier 300 that requires a ticket for general admission. In another embodiment, the supplier 300 could be a tour, a theater performance, a sporting event, an excursion, a form of transportation, or any other form of supplier 300 that is capacity-limited.

As will be described in greater detail below, the integration system 100 is capable of integrating data related to the purchase, booking, and cancellation of a ticket via execution of the booking module 162, the usage of the ticket via execution of the usage module 164, and activation of the ticket via execution of the activation module 166.

The purchase of a ticket at the distributor 200 and the booking of the ticket at the supplier 300 using the integration system 100 will now be described with reference to FIGS. 1-4.

Figure 2:
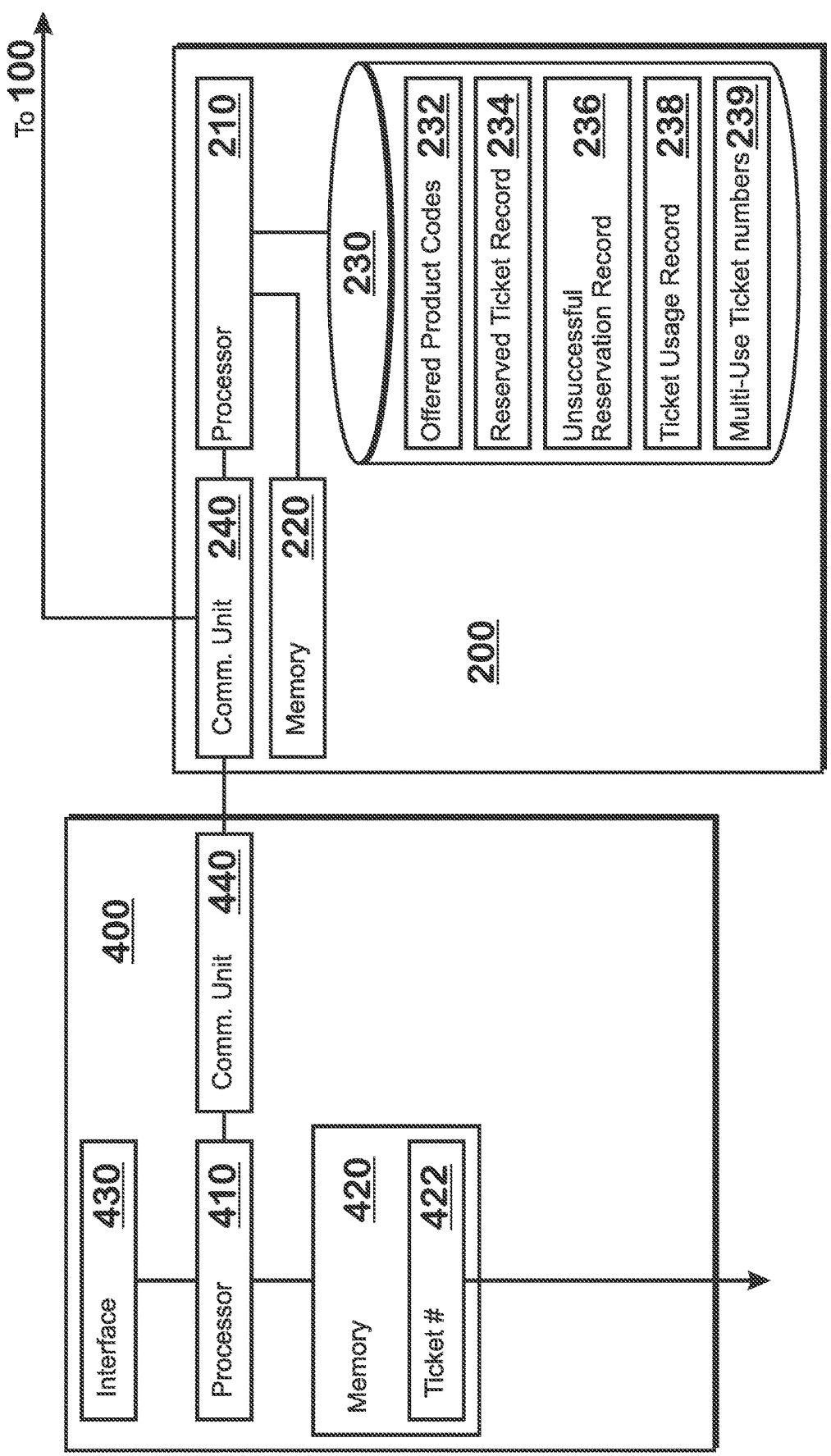
FIG. 2 is a schematic diagram of the distributor and the consumer device.

A consumer initiates the purchase of the ticket at the distributor 200. Each of the distributors 200, as shown in FIGS. 1 and 2, includes a processor 210 and a memory 220, a distributor database 230, and a communication unit 240 connected to the processor 210. The memory 220 is a non-transitory computer readable medium storing instructions thereon executable by the processor 210 to perform the functions of the processor 210 described herein. The distributor database 230 stores a plurality of offered product codes 232 each corresponding to a ticket offered by a supplier 300. The distributor database 230 may store available product codes 232 for tickets at one supplier 300 or tickets at a plurality of different suppliers 300.

In an exemplary embodiment, the consumer uses a consumer device 400 shown in FIGS. 1 and 2 to initiate the purchase of the ticket. The consumer device 400 includes a processor 410 and a memory 420, an interface 430, and a communication unit 440 connected to the processor 410. The memory 420 is a non-transitory computer readable medium storing instructions thereon executable by the processor 410 to perform the functions of the processor 410 described herein. The interface 430 is an input/output device used by the consumer to input instructions to the consumer device 400 and to relay information to the consumer. In various embodiments, the interface 430 may be a touch screen, a screen with a keyboard and mouse, or any other type of interface for an electronic device known to those with ordinary skill in the art.

The consumer uses the interface 430 to access information of the distributor 200. The communication unit 440 of the consumer device 400 sends a query to the communication unit 240 of the distributor 200 to retrieve ticket information. Each of the communication units 240, 440 is any device that is capable of relaying electronic communications. In various embodiments, each of the communication units 240, 440 may be an Internet-based communication device such as a wi-fi device or a cellular device, or may be a short-range communication device such as a Bluetooth device. The communication unit 240 of the distributor 200 receives the query and the processor 210 retrieves the tickets offered by various suppliers 300 of the distributor 200 which correspond to the offered product codes 232. The offered tickets are transmitted back to the communication unit 440 and presented to the consumer on the interface 430 of the consumer device 400.

The consumer selects a ticket or a plurality of tickets for purchase using the interface 430. In conjunction with the product codes corresponding to the selected tickets of the offered product codes 232, the consumer also inputs consumer information including the name, contact information, and ticket delivery information for the consumer. In some embodiments, the consumer information also includes guest information on persons other than the consumer who will be using some of the selected tickets, such as for a family or other group booking a plurality of tickets in one transaction. The selected product codes along with the consumer information are transmitted to the distributor 200 via the communication units 440, 240. In another embodiment, the consumer can access the distributor 200 in-person and initiate the purchase of the ticket without the use of the consumer device 400.

The processor 210 of the distributor 200 generates a booking message including a distributor ID, a distributor order number, the selected product codes, and the consumer information and transmits the booking message to the integration system 100 via the Internet.

The execution of a booking fulfillment process 500 by the processor 110 of the integration system 100 will now be described in greater detail with reference to FIG. 3.

The integration system 100 receives the booking message from the distributor 200 at the communication gateway 150. In a first step 510, the processor 110 executes the routing module 154 to determine whether the received data, in this case the booking message, came from a distributor 200 or a supplier 300 and routes the data to the corresponding distributor API 156 or supplier API 158. In this instance, the routing module 154 routes the booking message to the distributor API 156 which translates the booking message into a format interpretable by the processor 110 and programs of the integration system 100.

The processor 110 then executes the authentication module 152 in a second step 520 to authenticate the booking message. The authentication module 152 compares the distributor ID in the booking message to the list of valid IDs 124 stored in the memory 120. If the distributor ID in the booking message matches one of the valid IDs 124, the authentication module 152 transmits the booking message to the booking module 162.

In a third step 530, the processor 110 executes the booking module 162 to validate the booking message. The booking module 162 compares the product codes in the booking message with the now-validated distributor ID to product codes associated with the valid distributor IDs 124 in the memory 120. The booking module 162 also compares the product codes to the code mapping table 122 to determine that suppliers 300 exist for the product codes and to determine which suppliers 300 are associated with the product codes. If the booking module 162 determines that the product codes are valid for the particular distributor ID and the product codes are associated with an existing supplier 300, as part of the validation step 530 and based on the product codes and the suppliers 300 associated with the product codes in the code mapping table 122, the booking module 162 determines whether the product codes correspond to a capacity-limited event in a step 532.

If the product codes do not correspond to a capacity-limited event, the booking module 162 proceeds to create a new booking in a step 540. To create a new booking, the booking module 162 records the booking in a ticket booking record 132 in the system database 130. The stored booking record includes the distributor order number, the product codes, and the consumer information.

The booking module 162 also records events corresponding to the booking in the event store 140 in the fourth step 540, including a create booking event and an add or remove booking items event. The event store 140 is a log of activities undertaken by the booking module 162 and can record events differently based on various ways the distributor 200 transmits the booking message to the integration system 100. In an embodiment of the invention, one booking message sent from the distributor 200 includes all of the information required for the booking fulfillment process 500 including the product codes and all of the consumer information. In this embodiment, the booking module 162 logs one create booking event and one add or remove booking items event in the event store 140. In another embodiment, the distributor 200 sends a plurality of booking messages for one booking including a message to create a booking and individual messages with pieces of the consumer information and/or pieces of the guest information to populate the booking. In this embodiment, the booking module 162 logs one create booking event and a plurality of add or remove booking items events. The add or remove booking items events can include, for example, adding a product code, removing a product code, adding a guest, removing a guest, and may include specifying whether the guest is an adult or a child.

Once the new booking is created in step 540, the booking module 162 transmits the booking to the relevant supplier 300 associated with the product codes in the code mapping table 122 in a fifth step 550. The booking module 162 translates the booking at the supplier API 158 and sends the booking in the supplier 300 format to the supplier 300 via the communication gateway 150. In an embodiment in which the product codes in the booking message from the distributor 200 correspond to a plurality of different suppliers 300, the booking module 162 translates and sends the booking in the supplier 300 format to each supplier 300 via the communication gateway 150.

Figure 4:
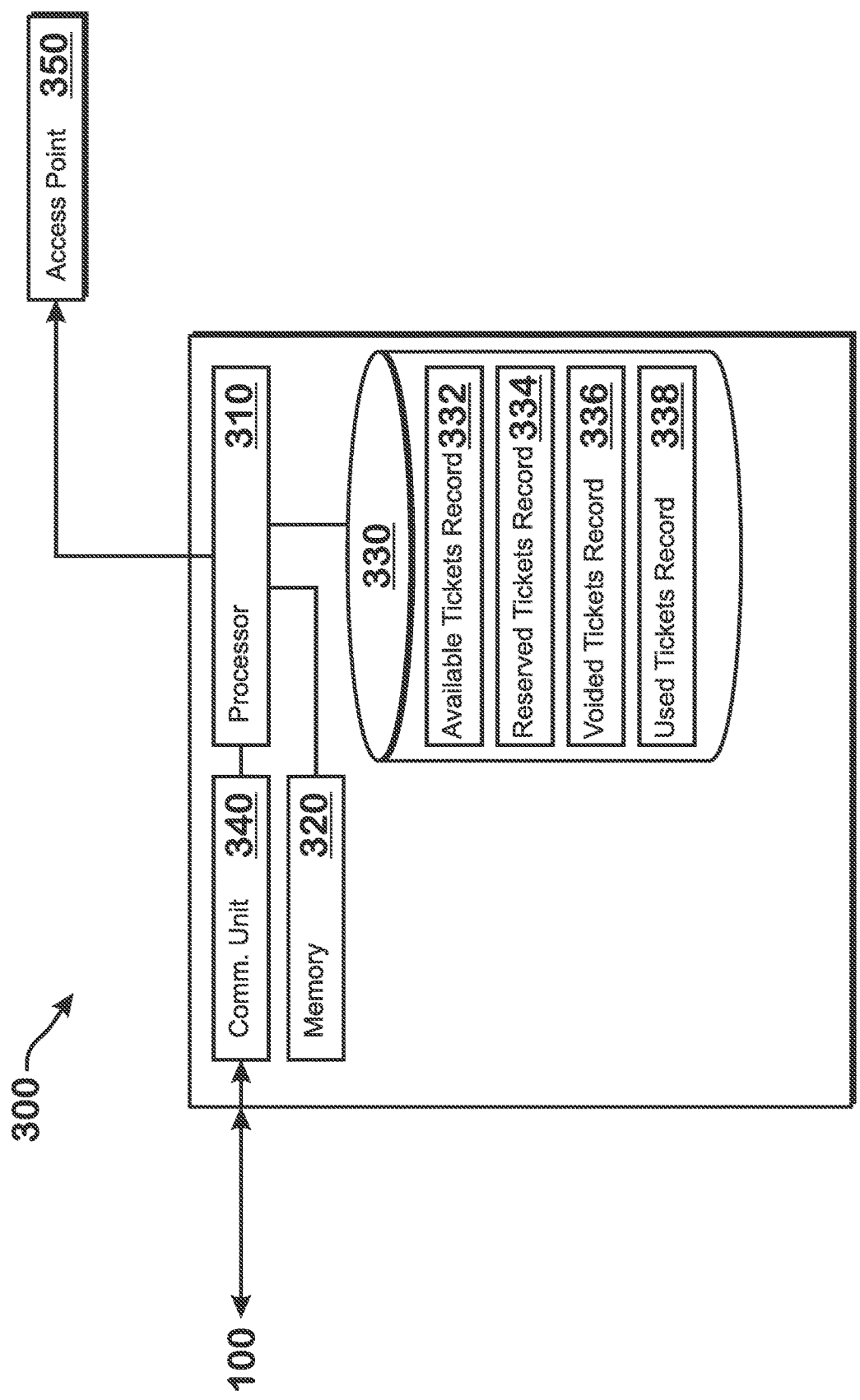
FIG. 4 is a schematic diagram of the supplier.

The supplier 300 receives the booking from the integration system 100 at a communication unit 340 of the supplier 300 shown in FIG. 4. The communication unit 340 is a connected to a processor 310 and the processor 310 is also connected to a memory 320, a ticket database 330, and an access point 350 of the supplier 300. The memory 320 is a non-transitory computer readable medium storing instructions thereon executable by the processor 310 to perform the functions of the processor 310 described herein. The access point 350 may be any device capable of reading a code and transmitting the results of the reading to the processor 310. In various embodiments, the access point 350 may be a handheld scanner, a scanner coupled with a turnstile, or any other access structure known to those with ordinary skill in the art and is capable of scanning a barcode, a Quick Response ("QR") code, or any other type of code used for tickets.

The processor 310, based on the booking received at the communication unit 340 which includes the distributor order number, the product codes, and the consumer information, compares the product codes in the booking to an available tickets record 332 stored in the ticket database 330. If the product codes in the booking match available tickets, the processor 310 moves the available tickets from the available tickets record 332 to a reserved tickets record 334 in the ticket database 330. Each of the reserved tickets in the reserved tickets record 334 stored in the ticket database 330 includes a ticket number and the associated consumer information. The available tickets record 332 and the reserved tickets record 334 are stored in the ticket database 300 ordered by event. The processor 310, via the communication unit 340, transmits the reserved ticket information corresponding to the booking along with a supplier ID and a supplier order number back to the integration system 100.

If it is determined by the booking module 162 in step 532 that the product codes correspond to a capacity-limited event, the booking module 162 proceeds to execute a check inventory process 590. In a first step 592, the booking module 162 transmits the product codes to the supplier 300. The supplier 300 receives the product codes and the processor 310 checks the available tickets in the available tickets record 332 of the supplier database 330 against the product codes to determine whether the supplier 300 has remaining inventory of the requested tickets in a step 594. If the supplier 300 does not have any inventory, the processor 310 sends an unsuccessful booking response 596 to the integration system 100 including the supplier ID, the product codes, and the consumer information. If the supplier 300 does have inventory, the processor 310 holds the available tickets by temporarily categorizing the available tickets as reserved tickets in the reserved tickets record 334 in the supplier database 330 and sends a hold response 598 to the integration system 100 including the supplier ID and the product codes.

Figure 3:
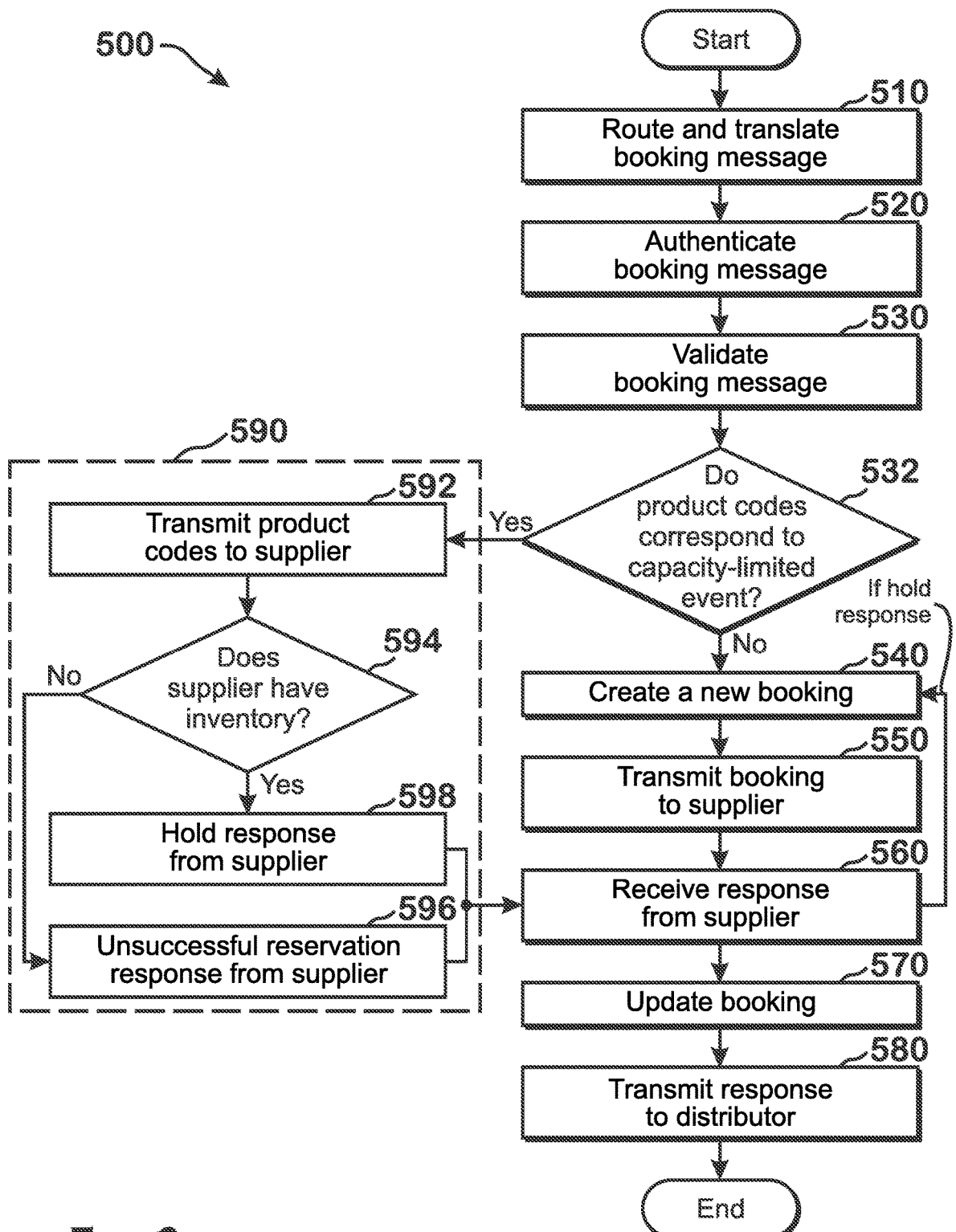
FIG. 3 is a flow diagram of a booking fulfillment process executed by the cloud-based data integration system.

The integration system 100 receives the response from the supplier 300 in a sixth step 560 shown in FIG. 3. As described above for the booking message from the distributor 200, the communication gateway 150 receives the supplier response, the routing module 154 routes the supplier response to the supplier API 158, and the authentication module 152 authenticates the supplier response based on a comparison of the supplier ID to the valid IDs 124. If the supplier ID matches one of the valid IDs 124, the authentication module 152 transmits the supplier response to the booking module 162. If the supplier response is a hold response, the booking fulfillment process loops back to create a new booking in step 540 and complete booking of the held tickets.

The booking module 162 updates the booking in the ticket booking record 132 and the event store 140 based on the response received from the supplier 300 in a seventh step 570. The booking module 162 updates the booking by recording the reserved ticket information and the supplier order number associated with the consumer information and the distributor order number in the ticket booking record 132. The booking module 162 also adds a booking fulfilled event and booking items fulfilled event to the event store 140. If no response is received from the supplier 300, the booking module 162 updates the booking by recording an error code associated with the distributor order number and the consumer information in the ticket booking record 132 and adding a booking unfulfilled event and booking items unfulfilled event to the event store 140. If the response received from the supplier 300 is an unsuccessful booking response, the booking module 162 updates the booking by recording an unsuccessful booking associated with the distributor order number and the consumer information in the ticket booking record 132 and adding a booking unfulfilled event and booking items unfulfilled event to the event store 140.

The booking module 162 translates the response at the distributor API 156 and transmits the response in the distributor 200 format to the distributor 200 via the communication gateway 150 in an eighth step 580. The response includes the reserved ticket information and supplier order number in the case of a successful booking, an error code in the case of no response from the supplier 300, or an unsuccessful booking response.

The distributor 200 receives the response at the communication unit 240 shown in FIG. 2. If the response is reserved ticket information, the distributor 200 stores the reserved ticket information in a reserved ticket record 234 of the distributor database 230. The reserved ticket record 234 includes the distributor order number, the supplier order number, the ticket number, and the associated consumer information. The processor 210 transmits the distributor order number, the supplier order number, the ticket number, and the associated consumer information to the consumer device 400, and the processor 410 of the consumer device 400 stores at least the ticket number 422 in the memory 420. If the response is an error code or an unsuccessful booking response, the distributor 200 stores the error code or unsuccessful booking message associated with the distributor order number and the consumer information in a unsuccessful booking record 236 of the distributor database 230 and transmits an unsuccessful booking message to the consumer device 400.

The cancellation of a ticket booked through the distributor 200 at the supplier 300 using the integration system 100 will now be described with reference to FIGS. 1, 2, 4, and 5.

In an embodiment of the invention, a customer initiates the cancellation of a ticket at the distributor 200. The processor 410 of the customer device 400 transmits a cancellation request to the processor 210 of the distributor 200 with the distributor order number, the ticket number, and the associated customer information. The distributor 200 removes the information from the reserved ticket record 234 and transmits a cancellation message to the integration system 100 including the distributor ID, the distributor order number, the ticket number, and the associated customer information. In another embodiment, the distributor 200 can initiate the cancellation of the ticket if the ticket is unused and the customer requests a refund. A ticket usage record 238 stored in the distributor database 230 will be described in greater detail below.

Figure 5:
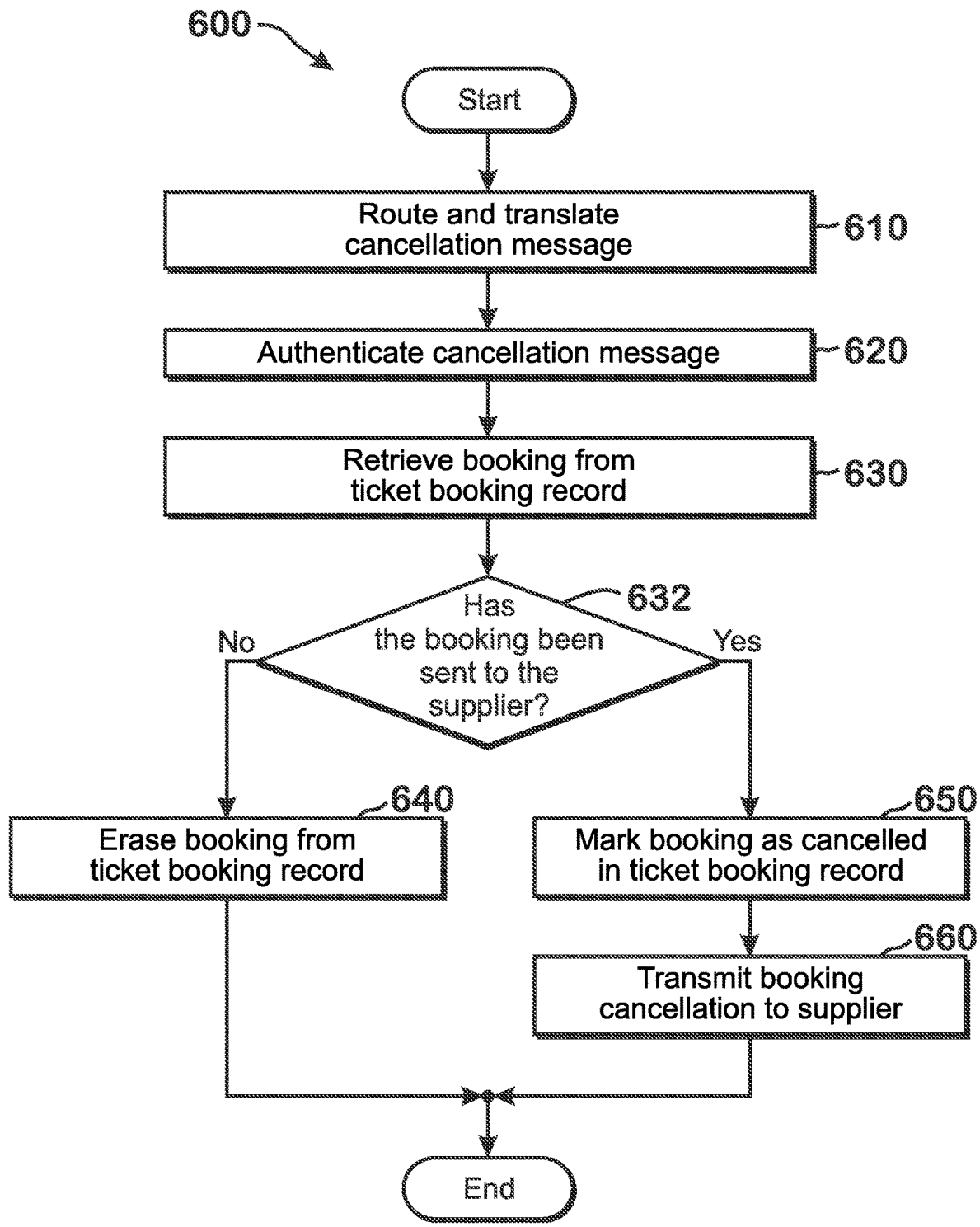
FIG. 5 is a flow diagram of a booking cancellation process executed by the cloud-based data integration system.

The execution of a booking cancellation process 600 by the processor 110 of the integration system 100 is shown in FIG. 5.

The integration system 100 receives the cancellation message from the distributor 200 at the communication gateway 150. Similarly to the booking fulfillment process, in a first step 610 the processor 110 executes the routing module 154 to send the cancellation message to the distributor API 156 where the cancellation message is translated. The processor 110 then executes the authentication module 152 to authenticate the distributor ID in a second step 620 and, if authenticated, transmits the cancellation message to the booking module 162.

In a third step 630, the processor 110 executes the booking module 162 to retrieve the booking corresponding to that in the cancellation message from the ticket booking record 132. The booking module 162 determines whether the booking has already been sent to the supplier 300 in a step 632.

If the booking has not been sent to the supplier 300, the processor 110 executes the booking module 162 to erase the booking from the ticket booking record 132 in a step 640. The booking module 162 records a deletion event in the event store 140 when erasing the booking in step 640. In this instance, the consumer never receives a ticket from the supplier 300.

If the booking had previously been sent to the supplier 300, the processor 110 executes the booking module 162 to mark the booking as cancelled in the ticket booking record 132 in a step 650. The booking module 162 records a cancellation event in the event store 140 when cancelling the booking. The booking module 162 then transmits the booking cancellation to the supplier 300 in step 660. In step 660, the booking module 162 translates the booking cancellation at the supplier API 158 and sends the booking cancellation in the supplier 300 format to the supplier 300 via the communication gateway 150.

The processor 310 of the supplier 300 receives the booking cancellation at the communication unit 340 which includes the distributor order number, the supplier order number, the ticket numbers, and the consumer information. The processor 310 compares the booking cancellation to the reserved tickets record 334 and moves the corresponding cancelled tickets from the reserved tickets record 334 to a voided tickets record 336.

The integration system 100, as will be described with reference to FIGS. 1, 4, and 6, also tracks the usage of a reserved ticket at the supplier 300.

The consumer or other guest associated with the ticket uses the ticket to gain access to an event at the supplier 300. In an embodiment of the invention, the ticket number 422 on the consumer device 400 is read by the access point 350 located at the supplier 300. The ticket number 422 may be embodied as any type of barcode scanned by the access point 350, may be a multiple digit number entered manually at the access point 350, or may be any other representation of the ticket number 422.

The access point 350 transmits the read ticket number 422 to the processor 310, which compares the ticket number 422 to the reserved tickets record 334 and the voided tickets record 336. If the ticket number 422 is in the reserved tickets record 334, the processor 310 instructs the access point 350 to permit entry and moves the ticket from the reserved tickets record 334 to a used tickets record 338 in the supplier database 330. The processor 310 also transmits a ticket usage message to the integration system 100 including the supplier ID, the supplier order number, the ticket number, and the associated consumer information. If the ticket number 422 is in the voided tickets record 336, the processor 310 instructs the access point 350 to not permit entry.

Figure 6:
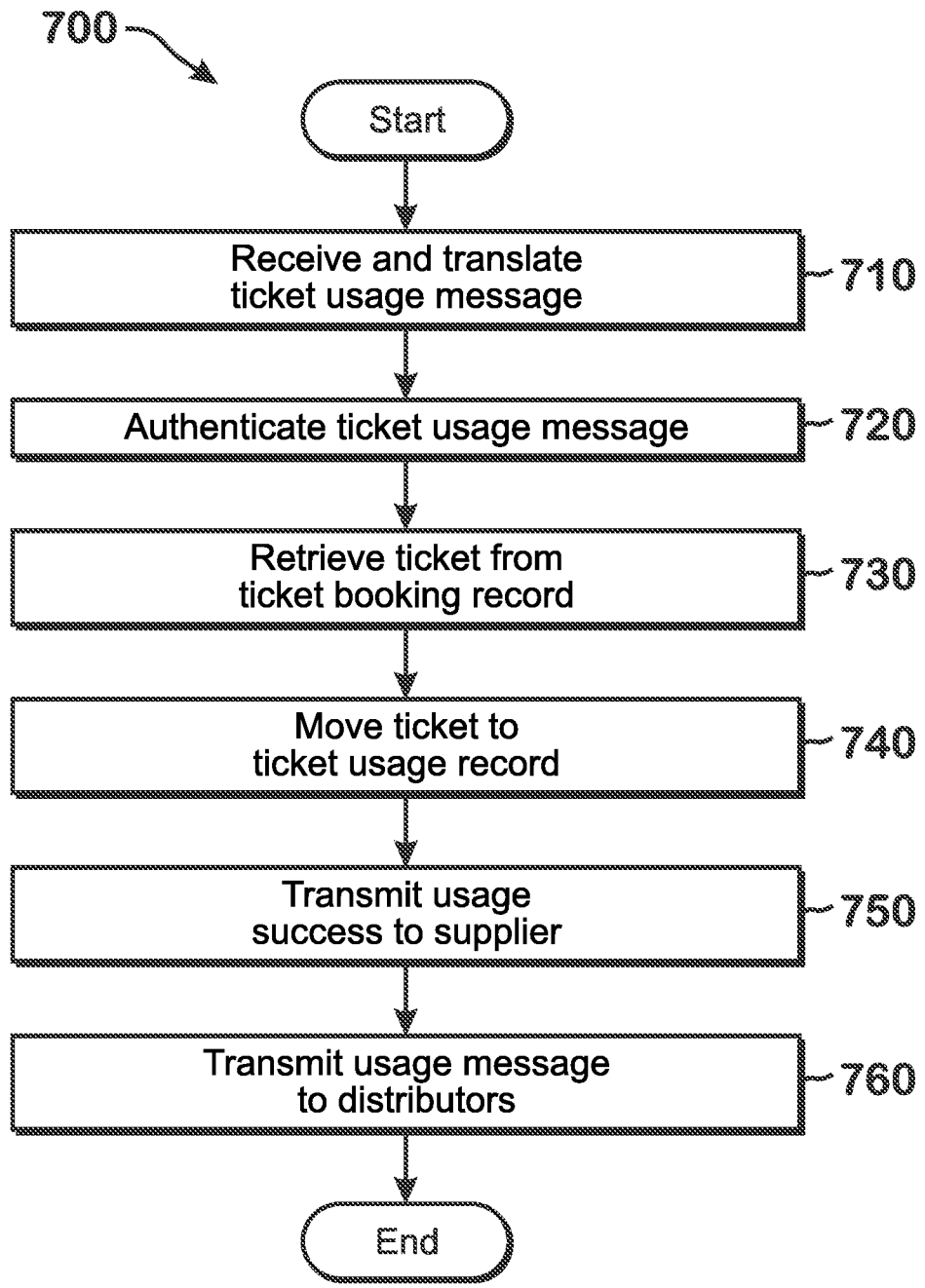
FIG. 6 is a flow diagram of a ticket usage process executed by the cloud-based data integration system.

The execution of a ticket usage process 700 by the processor 110 of the integration system 100 is shown in FIG. 6.

The integration system 100 receives the ticket usage message from the supplier 300 at the communication gateway 150. Similarly to the processes described above, in a first step 710 the processor 110 executes the routing module 154 to send the ticket usage message to the supplier API 158 where the ticket usage message is translated. The processor 110 then executes the authentication module 152 to authenticate the supplier ID in a second step 720 and, if authenticated, transmits the ticket usage message to the usage module 164.

In a third step 730, the processor 110 executes the usage module 164 to retrieve the ticket corresponding to that in the ticket usage message from the ticket booking record 132. The usage module 164 compares the product codes corresponding to the ticket in the ticket booking record 132 and supplier ID to the code mapping table 122 to determine which distributor 200 or distributors 200 are associated with the ticket. The usage module 164 moves the ticket from the ticket booking record 132 to the ticket usage record 134 in step 740. The usage module 164 also records a usage event in the event store 140.

With the ticket usage successfully recorded, the processor 110 executes the usage module 164 to transmit a usage recordation message to the supplier 300 via the communication gateway 150 in a step 750. The usage module 164 then transmits a ticket usage message to the determined distributors 200 in a step 760 via the communication gateway 150. The ticket usage message to the distributors 200 includes the distributor order number, the ticket number, and the associated consumer information. Both the usage recordation message to the supplier 300 and the ticket usage message to the distributor 200 is translated via the respective API 156, 158 as described above.

The distributor 200 receives the ticket usage message at the communication unit 240 and the processor 210 compares the ticket usage message to the reserved ticket record 234. The processor 210 moves the ticket in the ticket usage message from the reserved ticket record 234 to the ticket usage record 238. The distributor 200 may determine if a ticket can be refunded based on the ticket usage record 238 of the distributor database 230.

The integration of data using the integration system 100 for a multi-use ticket booked through the distributor 200 will now be described with reference to FIGS. 1, 2, 4, and 7. A multi-use ticket has a ticket number issued by the distributor 200 and can be used at multiple different suppliers 300. In an exemplary embodiment, the distributor 200 is an entity selling a multi-use ticket to a plurality of attractions in a city. In this exemplary embodiment, the multi-use ticket is valid at five different suppliers 300 in the city but can only be used three different times before the multi-use ticket is invalid. Other embodiments in which multiple uses of a ticket are tracked across multiple different suppliers 300 are also possible.

A consumer initiates the purchase of the multi-use ticket at the distributor 200 using the consumer device 400 or an in-person request as similarly described above. The consumer selects the multi-use ticket for purchase and inputs the consumer information. Based on the selected product code corresponding to a multi-use ticket, the processor 210 retrieves a multi-use ticket number from a plurality of available multi-use ticket numbers 239 stored in the distributor database 230 and transmits the multi-use ticket number to the consumer device 400. The processor 210 also moves the multi-use ticket number to the reserved ticket record 234. In the multi-use ticket embodiment, the distributor 200 issues the ticket number. The multi-use ticket number is stored as the ticket number 422 on the consumer device 400.

The processor 210 generates a multi-use ticket message including a distributor ID, a distributor order number, a ticket number, the product codes, and the consumer information and transmits the multi-use ticket message to the integration system 100 via the Internet.

Figure 7:
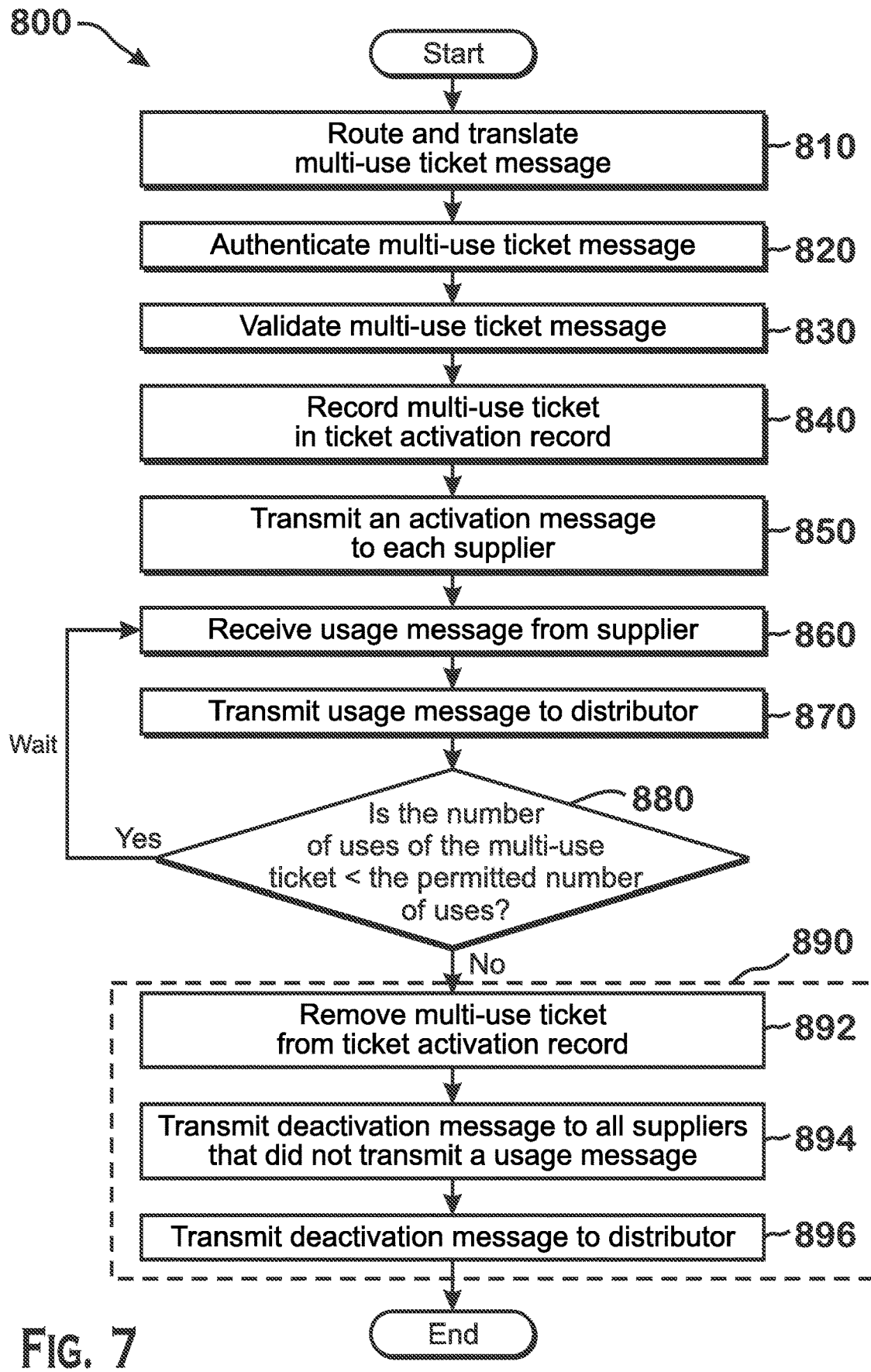
FIG. 7 is a flow diagram of a multi-use ticket activation process executed by the cloud-based data integration system.

The execution of a multi-use activation process 800 by the processor 110 of the integration system 100 will now be described in greater detail with reference to FIG. 7.

The integration system 100 receives the multi-use ticket message from the distributor 200 at the communication gateway 150. In a first step 810 the processor 110 executes the routing module 154 to send the multi-use ticket message to the distributor API 156 where the multi-use ticket message is translated. The processor 110 then executes the authentication module 152 to authenticate the distributor ID in a second step 820 and, if authenticated, transmits the multi-use ticket message to the activation module 166.

In a third step 830, the processor 110 executes the activation module 166 to validate the multi-use ticket message. The activation module 166 compares the product codes in the multi-use ticket message with the now-validated distributor ID to product codes associated with the valid distributor IDs 124 in the memory 120. The activation module 166 also compares the product codes to the code mapping table 122 to determine that suppliers 300 exist for the product codes and to determine which suppliers 300 are associated with the product codes of the multi-use ticket.

If the activation module 166 determines that the product codes of the multi-use ticket are valid for the particular distributor ID and the product codes are associated with existing suppliers 300, the activation module 166 records the multi-use ticket in a ticket activation record 136 of the system database 130 in a step 840. The multi-use ticket is recorded in the ticket activation record 136 with the multi-use ticket number, the number of permitted uses, and the valid suppliers 300 corresponding to the multi-use ticket. The activation module 166 also adds a ticket activation event to the event store 140.

In a step 850, the processor 110 executes the activation module 166 to transmit an activation message to each valid supplier 300 corresponding to the multi-use ticket. The activation module 166 translates the activation message at the supplier API 158 and sends the activation message to each supplier 300 via the communication gateway 150. Each activation message includes the multi-use ticket number and the associated consumer information.

Each supplier 300 receives the activation message with the multi-use ticket number and stores the multi-use ticket number in the reserved tickets record 334 shown in FIG. 4. Each of the suppliers 300 valid for the multi-use ticket number has the multi-use ticket number stored in the reserved tickets record 334.

The consumer or other guest associated with the multi-use ticket uses the multi-use ticket to gain access to an event at one of the suppliers 300. The multi-use ticket number 422 is read by the access point 350 as similarly described above and the access point 350 transmits the read ticket number 422 to the processor 310 which compares the ticket number 422 to the reserved tickets record 334 and the voided tickets record 336. If the ticket number 422 is in the reserved tickets record 334, the processor 310 instructs the access point 350 to permit entry and moves the multi-use ticket from the reserved tickets record 334 to a used tickets record 338 in the supplier database 330. The processor 310 also transmits a ticket usage message to the integration system 100 including the supplier ID, the multi-use ticket number, and the associated consumer information. If the ticket number 422 is in the voided tickets record 336, the processor 310 instructs the access point 350 to not permit entry.

The integration system 100 receives the ticket usage message from one of the suppliers 300 in step 860. Step 860 is similar to steps 710-740 of the ticket usage process 700 shown in FIG. 7. The integration system 100 receives the ticket usage message from the supplier 300 at the communication gateway 150. The processor 110 executes the routing module 154 to send the ticket usage message to the supplier API 158 where the ticket usage message is translated. The processor 110 then executes the authentication module 152 to authenticate the supplier ID in a second step 720 and, if authenticated, transmits the ticket usage message to the activation module 166. The activation module 166 retrieves the multi-use ticket corresponding to that in the ticket usage message from the ticket activation record 136. The activation module 166 records one use of the multi-use ticket in the ticket usage record 134 and records a single usage event in the event store 140.

The processor 110 controls the activation module 166 to send the ticket usage message to the distributor 200 in step 870; the ticket usage message is translated at the distributor API 156 and transmitted to the distributor 200 via the communication gateway 150. The distributor 200 receives the ticket usage message at the communication unit 240 and the processor 210 compares the ticket usage message to the multi-use ticket numbers in the reserved ticket record 234. The processor 210 records a single usage of the multi-use ticket number in the ticket usage record 238.

In step 880, the processor 110 executes the activation module 166 to reference the ticket activation record 136 and the ticket usage record 134 to determine whether the number of uses of the multi-use ticket stored in the ticket usage record 134 is less than the permitted number of uses stored in the ticket activation record 136. If the number of uses of the multi-use ticket is determined to be less than the permitted number of uses, the multi-use activation process 800 loops back to step 860 to wait for more ticket usage messages from other suppliers 300.

If the number of uses of the multi-use ticket is not less than the permitted number of uses, the multi-use activation process 800 proceeds to a multi-use deactivation sub-process 890. In a step 892, the activation module 166 removes the multi-use ticket from the ticket activation record 136 and records a ticket deactivation event in the event store 140.

The activation module 166 then transmits a deactivation message to all suppliers 300 that did not transmit a usage message in step 894. The activation module 166 translates the activation message at the supplier API 158 and sends the deactivation message to each supplier 300 that did not transmit a usage message via the communication gateway 150. Each deactivation message includes the multi-use ticket number and the associated consumer information. Each supplier 300 that did not transmit a usage message receives the deactivation message and moves the multi-use ticket number from the reserved tickets record 334 to the voided tickets record 336.

In a final step 896 of the deactivation sub-process 890, the activation module 166 transmits a deactivation message to the distributor 200. The activation module 166 translates the deactivation message at the distributor API 156 and sends the deactivation message to the distributor 200 via the communication gateway 150. Each deactivation message includes the distributor order number, the multi-use ticket number, the number of uses, and the associated consumer information. The distributor 200 receives the deactivation message and removes the multi-use ticket from the reserved ticket record 234.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A cloud-based data integration system, comprising:
   a communication gateway configured to receive a booking message or a multi-use ticket message from a distributor of a plurality of distributors connected to the integration system;
   a system database including a ticket booking record and a ticket usage record;
   and a processor executing a plurality of service modules, a booking module of the service modules is configured to:
   validate the booking message and determine a supplier of a plurality of suppliers connected to the integration system that corresponds to the booking message;
   create a booking in the ticket booking record based on the booking message;
   and transmit the booking to the supplier corresponding to the booking of the plurality of suppliers connected to the integration system;
   and the service modules include an activation module configured to:
   validate the multi-use ticket message and determine a subset of the plurality of suppliers
   associated with a multi-use ticket usable at each of the suppliers of the subset;
   transmit an activation message to the subset of the plurality of suppliers associated with the multi-use ticket, wherein a number of suppliers in the subset associated with the multi-use ticket is greater than the permitted number of uses of the multi-use ticket;
   receive a usage message from one of the subset of the plurality of suppliers;
   record a usage of the multi-use ticket in the ticket usage record;
   determine whether a number of uses of the multi-use ticket is less than a permitted number of uses of the multi-use ticket; and
   deactivate the multi-use ticket if the number of uses is not less than the permitted number of uses by transmitting a deactivation message to only the suppliers of the subset of the plurality of suppliers associated with the multi-use ticket that did not transmit the usage message.

2. The cloud-based data integration system of claim 1, wherein the communication gateway includes a routing module and an authentication module executable by the processor.

3. The could-based data integration system of claim 2, wherein the communication gateway includes a distributor API and a supplier API.

4. The cloud-based data integration system of claim 3, wherein the processor executes the routing module to route the booking message to the distributor API and the distributor API translates the booking message to a format interpretable by the processor.

5. The cloud-based data integration system of claim 1, wherein the booking module determines whether the booking message corresponds to a capacity-limited event after validating the booking message and before creating the booking in the ticket booking record.

6. The cloud-based data integration system of claim 1, wherein the booking module is configured to cancel the booking at the supplier.

7. The cloud-based data integration system of claim 1, wherein a usage module of the service modules compares product codes corresponding to a ticket in the ticket booking record and a supplier ID to a code mapping table to determine one or more distributors associated with the ticket.

8. The cloud-based data integration system of claim 7, wherein the usage module transmits a ticket usage message to the determined one or more distributors via the communication gateway.

9. The cloud-based data integration system of claim 8, wherein the ticket usage message to the one or more distributors includes a distributor order number, a ticket number, and associated consumer information.

10. The cloud-based data integration system of claim 9, wherein the one or more distributors receives the ticket usage message by a communication unit and a processor compares the ticket usage message to a reserved ticket record.

11. The cloud-based data integration system of claim 10, wherein the processor moves the ticket in the ticket usage message from the reserved ticket record to the ticket usage record.

\* \* \* \* \*

UNITED STATES PATENT AND TRADEMARK OFFICE
CERTIFICATE OF CORRECTION

PATENT NO. : 10,984,348 B2
APPLICATION NO. : 15/909259
DATED : April 20, 2021
INVENTOR(S) : Michael M. Andre and James W. Fritchman Page 1 of 1

It is certified that error appears in the above-identified patent and that said Letters Patent is hereby corrected as shown below:

In the Claims

Claim 3, Column 12, Line 55, "could-based" should read --cloud-based--

Signed and Sealed this
Seventh Day of November, 2023

Katherine Kelly Vidal
*Director of the United States Patent and Trademark Office*